United States Patent [19]

Dufresne et al.

[11] Patent Number: 4,501,656

[45] Date of Patent: Feb. 26, 1985

[54] DEWAXING PROCESS EMPLOYING A CATALYST WITH A HIGHLY DEALUMINATED MORDENITE BASE

[75] Inventors: Pierre Dufresne; Edouard Freund, both of Rueil Malmaison; Christian Marcilly, Houilles; Francis Raatz, Rueil Malmaison, all of France

[73] Assignee: Institut Francais du Petrole, Rueil-Malmaison, France

[21] Appl. No.: 507,415

[22] Filed: Jun. 23, 1983

[30] Foreign Application Priority Data

Jun. 23, 1982 [FR] France ................................ 82 11132

[51] Int. Cl.³ ...................... C10G 45/12; C10G 45/64; C10G 47/20
[52] U.S. Cl. ................................ 208/111; 208/216 R; 502/78
[58] Field of Search ................... 208/111, 216 R, 217, 208/110

[56] References Cited

U.S. PATENT DOCUMENTS 3,663,430  5/1972  Morris ................................... 208/111
4,180,693 12/1979  Marcilly ............................... 585/475

FOREIGN PATENT DOCUMENTS 1134015 11/1968 United Kingdom ................ 208/111

Primary Examiner—Delbert E. Gantz
Assistant Examiner—O. Chaudhuri
Attorney, Agent, or Firm—Millen & White

[57] ABSTRACT

A new catalyst with a highly dealuminated mordenite base, useful in particular in hydrotreatment processes for improving the low temperature properties and the pour point and cloud point of oil cuts contains:

(1) an acidic carrier comprising
  (a) at least 50% (calculated as dry base) of highly dealuminated mordenite and characterized by a molar ratio $SiO_2/Al_2O_3$ higher than 110 and a sodium content lower than or equal to 0.5% by weight, and
  (b) an amorphous matrix, and
(2) said acid carrier containing in association at least one oxide of a metal from group VIII and at least one oxide of a metal from group VI of the periodic classification of elements.

7 Claims, No Drawings

DEWAXING PROCESS EMPLOYING A CATALYST WITH A HIGHLY DEALUMINATED MORDENITE BASE

The present invention relates to a new zeolitic catalyst which is particularly useful for improving the low temperature properties and the hydrodesulfurization of a middle distillate gas-oil.

The catalyst of the present invention comprises an acid carrier with a highly dealuminated mordenite base, on which is deposited a combination of metals from group VI and group VIII of the periodic classification of the elements.

The highly dealuminated acidic mordenite is a hydrogen form mordenite, wherein a portion of the negative sites of the structure may optionally be neutralized by cations of alkaline earth metals, in particular $Be^{2+}$ and/or $Mg^{2+}$, and/or by at least one of the cations of the following rare earth metals: $La^{3+}$, $Ce^{3+}$, $Nd^{3+}$, $Pr^{3+}$. This mordenite is characterized by a molar ratio $SiO_2/Al_2O_3$ equal to or higher than 110 and preferably between 110 and 2000 and by a sodium content lower than or equal to 0.5% by weight.

This dealuminated mordenite is obtained by a series of treatments having the object of modifying the aluminosilicate structure by selective extraction of aluminum therefrom. These treatments which consist, on the one hand, of attacking the zeolite with a hot solution of a concentrated strong inorganic acid (one or several treatments with the acid will be effected) and, on the other hand, of calcining this zeolite above 450° C. in the presence of steam, are applied, in most cases, alternatively to the zeolite and repeated up to the achievement of the desired $SiO_2/Al_2O_3$ ratio. The attack by the acid is generally conducted between 50° and 150° C. in an aqueous solution of a strong inorganic acid such as HCl, $HNO_3$ or $H_2SO_4$, (concentration: preferably 0.1 to 10N) for a period from 15 minutes to 50 hours. The calcination is effected between 450° C. and 750° C. in the presence of a steam partial pressure comprised between 40 torrs (1 torr=133.32 Pa) and 1 megapascal (10 bars) for a period comprised between 15 minutes and 24 hours and preferably between 30 minutes and 8 hours. The series of treatments may begin with any one of the above two treatments, either attack with acid or calcination in the presence of steam, but the best results have been obtained according to this invention by beginning with one or even several successive acid attacks. The first calcination in wet air must preferably be conducted at a temperature lower than 550° C., but, on the contrary, the subsequent calcinations may be conducted at higher temperatures which may even be as high as 700°–750° C. starting from the third calcination.

The initial mordenite of sodic form used to prepare the dealuminated acid forms may be a mordenite with small pores of the type sold commercially by "Société francaise La Grande Paroisse" under the trademark "ALITE 150" and characterized by an effective pore size of about 0.4 nm, or a mordenite with large pores of the type sold by the American Corporation NORTON under the Trademark "ZEOLON" and characterized by an effective pore size of about 0.7 nm. The former absorbs less than 0.8% by weight of benzene at room temperature under a pressure of 25 torrs whereas the latter absorbs from 7 to 9% by weight thereof. These two zeolites, when present in a strongly dealuminated H form ($SiO_2/Al_2O_3 > 110$), give substantially equivalent results.

The dealuminated acid mordenite thus obtained is a hydrogen form mordenite. The ions of alkaline earth metals and/or rare earth metals precedingly mentioned are introduced by ionic exchange of the hydrogen form dealuminated mordenite in a solution of appropriate metal salts.

The so-obtained mordenite is intimately admixed with a wet powder of an alumina or silica-alumina gel. The mixture is then shaped, for example by extrusion through a drawing plate. The mordenite content of the so-obtained carrier must be higher than 50% and preferably comprised between 50 and 90% and more particularly between 55 and 90%, with a preference for the range of 58 to 85%. The shaping may be effected with other matrices than alumina or silica-alumina, such as silica-magnesia, alumina-boron oxide, and the like, etc . . . and with techniques other than extrusion, such as pelletizing, bowl granulation, and the like.

The so-obtained acid carrier, containing a dealuminated acid mordenite, is associated with a combination of at least one oxide of a group VI metal and with at least one oxide of a group VIII metal and preferably with $MoO_3$-NiO and $WO_3$-NiO couples. The concentration (with respect to the catalyst) of the metal VI oxide is comprised, by weight, between 6 and 35% and that of the metal VIII oxide is comprised, by weight, between 2 and 16%. These metal oxides are deposited, for example by impregnation, on the carrier by means of solutions of ammonium molybdate or tungstate and of a nickel salt solution. The nickel salt may be deposited after a first impregnation with the group VI metal salt, followed with a calcination between 200° and 500° C., or may be deposited simultaneously with the group VI metal salt. The preferred nickel salts are the nitrate, the formate and the acetate. After the last impregnation, the catalyst is dried between 80° and 300° C., then calcined between 400° and 650° C., preferably between 500° and 600° C. The NiO and $MoO_3$ or $WO_3$ contents of the final catalyst are within the following ranges:

NiO: between 2 and 16% by weight and preferably between 4 and 12%

$MoO_3$: between 6 and 35% by weight and preferably between 8 and 25%

$WO_3$: between 6 and 35% by weight and preferably between 8 and 30%

The content of at least one optional metal such as Be, Mg, La, Ce, Nd and Pr is preferably lower than 2% by weight.

This catalyst is used in particular for improving the behavior at low temperature of various oil cuts, kerosenes, lubricating oils, and particularly middle distillate gas-oils characterized by an initial point comprised generally between 180° and 320° C. and a final point comprised between 320° and 420° C., a sulfur content generally between 0.5 and 3.5% by weight, and a pour point and a cloud point generally higher than 0° C. One of the advantages of this catalyst is to provide simultaneously for the improvement of the low temperature properties and a substantial hydrodesulfurization of the involved oil cut.

The operating conditions are preferably as follows:
pressure from 1.0 to 10.0 megapascals and preferably between 2 and 7 megapascals,
temperature between 300° and 460° C. and preferably between 300° and 430° C., space velocity (VVH) in volume of charge per unit of catalyst volume and per hour, from 0.2 to 3 and preferably from 0.3 to 2, volumic ratio H$_2$/gas oil comprised between 200 liters per liter and 1500 liters per liter and preferably between 300 and 1000 liters per liter.

The use of the catalyst of the present invention in the above-described conditions provides improvements i.e. lowering of the pour point and of the cloud point by more than 10° C. and often by more than 20° C. and desulfurization rates higher than 90% and often higher than 95%.

The following examples illustrate the present invention:

EXAMPLE 1 (COMPARATIVE)

Preparation of a zeolite dealuminated to a small extent, forming the base of the catalyst A A powdered mordenite of sodic form as manufactured by NORTON corporation (ZEOLON 100 Na) is subjected to two successive acid attacks under the following conditions:
volume of solution in liter/weight of dry mordenite in kg = 10
selected acid: hydrochloric acid
concentration of the HCl solution: 2N
temperature: 85° C.
duration: 4 hours.

The H form mordenite issued from these treatments has a molar ratio SiO$_2$/Al$_2$O$_3$ = 21 and a residual sodium content of 0.13% by weight. It is washed extensively to remove the major part of the Cl$^-$ ions, dried, shaped as extrudates of a 2 mm diameter after intimate admixture with an alumina gel powder. The obtained carrier contains 60% by weight of zeolite.

This carrier is successively impregnated with an ammonium molybdate solution and then with a nickel nitrate solution at such concentrations as to obtain MoO$_3$ and NiO contents of the final catalyst of respectively 15 and 6% by weight. Between the two impregnations, a drying step is effected for 2 hours at 300° C. The final catalyst is calcined for 2 hours at 520° C.

EXAMPLE 2 (COMPARATIVE)

Preparation of a dealuminated zeolite used as base of catalyst B

The mordenite of H form issued from the two acid attacks effected in example 1 is subjected to calcination for three hours at 500° C. in the presence of air containing 50% of water. It is then again subjected to an acid attack identical to the first two, then to another calcination in wet air identical to the preceding one. The so-obtained zeolite of H form is characterized by a ratio SiO$_2$/Al$_2$O$_3$ equal to about 56% and a sodium content of 0.01%. It is then admixed with an alumina gel, shaped as extrudates and then impregnated with molybdenum and nickel salts under conditions and with amounts exactly identical to those of example 1.

EXAMPLE 3

Preparation of an extensively dealuminated zeolite used as base of catalyst C

The dealuminated mordenite of the preceding example (No. 2) characterized by a SiO$_2$/Al$_2$O$_3$ ratio of about 56, obtained after two acid attacks, a calcination in wet air, a third acid attack and finally a second calcination in wet air, is subjected to a new acid attack under the same conditions as in the preceding ones and then to a new calcination in wet air identical to the two preceding ones. The acid zeolite of hydrogen form thus obtained is characterized by a SiO$_2$/Al$_2$O$_3$ ratio of 115 and by a sodium content of 0.003% by weight. It is then admixed with an alumina gel, shaped as extrudates and impregnated with molybdenum and nickel salts in the conditions and with amounts exactly identical to those of examples 1 and 2.

EXAMPLE 4

Preparation of an extensively dealuminated zeolite used as base of catalyst D

The dealuminated mordenite of H form obtained at the end of example 3 (after the succession of the following treatments: two acid attacks, a calcination in wet air, an acid attack, a calcination in wet air, a new acid attack and a third calcination in wet air) is subjected to a fifth acid attack identical to the preceding ones and to a fourth calcination in wet air.

The acid zeolite of hydrogen form thus obtained is characterized by a SiO$_2$/Al$_2$O$_3$ ratio of about 350 and by a sodium content of 0.001% by weight. It is then admixed with an alumina gel, shaped as extrudates, then impregnated with molybdenum and nickel salts under the conditions and with amounts exactly identical to those of examples 1, 2 and 3.

EXAMPLE 5

Preparation of a catalyst E similar to catalyst C but differing from the latter by the temperature of the second calcination step in wet air and by the omission of the third calcination step A mordenite of H form obtained at the end of the first example (two acid attacks) is calcined for three hours at 500° C. in air containing 50% of steam, subjected to a new acid attack identical to the preceding one, then calcined at 600° C. in air containing 50% of steam, and finally subjected to a fourth and last acid attack in the same conditions as precedingly.

This zeolite is admixed with an alumina gel, shaped as extrudates and finally impregnated with molybdenum and nickel salts in conditions and with amounts exactly identical to those of the preceding examples No. 1 to 4.

EXAMPLE 6

Preparation of a catalyst F similar to catalyst E and containing magnesium

The dealuminated acid mordenite used for the manufacture of catalyst E is exchanged twice successively with a 0.5M solution of magnesium acetate at 20° C. for 5 hours. The obtained zeolite, which contains 0.4% by weight of magnesium, is then used to prepare catalyst F under conditions exactly identical to those of example No. 5 (catalyst E).

EXAMPLE 7

Preparation of a catalyst G similar to catalyst C, but differing from the latter only by the replacement of molybdenum with tungsten The acid carrier (dealuminated H mordenite + alumina) used for the preparation of catalyst C, is successively impregnated, in the same conditions as those of example No. 3, with solutions of tungsten and nickel salts in the required amount for depositing 6% of NiO and 15% of WO$_3$.

EXAMPLE 8 (COMPARATIVE)

Preparation of a catalyst H similar to catalyst C, but differing from the latter only by the nature of the hydrogenating group, a noble metal (platinum) being used instead of the couple $MoO_3 + NiO$ The powdered dealuminated zeolite obtained in example No. 3 for the preparation of catalyst C is poured and stirred in a volume V of aqueous solution such that the ratio of V in $cm^3$ to the weight P in grams of dry zeolite is equal to 6. To this solution is added progressively in two hours an amount of tetraaminoplatinum (II) nitrate $[Pt(NH_3)_4](NO_3)_2$, such that the total platinum amount involved during the operation amounts to 0.8% of the zeolite weight.

This product is then admixed with an alumina gel, shaped as extrudates containing 60% by weight of mordenite, then dried at 150° C. for 5 hours and calcined in dry air for 3 hours at 530° C.

EXAMPLE 9

Preparation of a catalyst I similar to catalyst C, prepared from a mordenite of sodic form with small pores A preparation identical to that of catalyst C is effected from mordenite of sodic form with small pores, sold by the French Corporation La Grande Paroisse under the Trademark ALITE 150 (instead of the ZEOLON 100 Na sold by NORTON, used for catalysts A to H).

The dealuminated acid mordenite used in this ninth example is characterized by a benzene adsorption higher than 7% by weight at room temperature under a pressure of 25 torrs.

EXAMPLE 10

Test of catalysts A, B, C, D, E, F, G, H and I for improving the cloud point and pour point and for hydrodesulfurizing a straight-run middle gas-oil The charge used for these tests is a straight-run middle gas-oil whose main characteristics are reported in Table 1 and which is characterized in particular by a cloud point and a pour point of +21° C. and a sulfur content of 2.05% by weight.

The catalyst is used in the following conditions:
total pressure = 40 bars (4 megapascals)
feed space velocity (VVH) as volume of charge per catalyst volume unit and per hour = 1
Volumic ratio $H_2$/gas-oil = 500 liters/liter
temperature variable in the range from 360° to 420° C.

The catalyst is first reduced with hydrogen at 240° C. for one hour and then sulfided by means of a charge of light gas-oil of distillation range from 210° to 340° C. containing 2% by weight of sulfur as dimethyldisulfide (DMDS) for eight hours at a VVH of 2 at 350° L C.

The temperature of the test is progressively increased by steps of 10 degrees from 360° C. until an improvement of the pour point of at least +15° C. and/or of the cloud point of +10° C. is obtained. The optimal temperature, lower than or equal to 420° C., at which performances at least equal to the latter can be obtained, is then kept for about 200 hours to evaluate the stability of the catalyst.

The performances of the catalyst are expressed with the aid of the following characteristics:
Yield by weight of cut 200+ (yield 200+)
Cloud point and pour point of the 200+ cut (CP 200+, PP 200+)
Desulfurization rate: % HDS The cloud point corresponds to the temperature at which the first paraffin crystals appear. The pour point corresponds to the setting temperature of the product.

The results obtained with catalysts A, B, C, D, E, F, G, H and I with a straight-run middle gas-oil charge, indicated in Table 1, are summarized in Table 2.

TABLE 1

| CHARACTERISTICS OF THE CHARGE = STRAIGHT RUN MIDDLE GAS OIL | | |
|---|---|---|
| Distillation:initial point (°C.) | | 280 |
| | 10% | 320 |
| | 30% | 336 |
| | 50% | 344 |
| | 70% | 351 |
| | 90% | 362 |
| | 100% | 370 |
| Density | 20° C. | 0.8805 |
| Viscosity | 40° C. | 11.1 cSt (11.1 × $10^{-6}$ $m^2$/sec) |
| | 50° C. | 8.1 cSt (8.1 × $10^{-6}$ $m^2$/sec) |
| | 100° C. | 2.8 cSt (2.8 × $10^{-6}$ $m^2$/sec) |
| Refraction index | 20° C. | 1.4919 |
| Aniline point °C. | | 76.2 |
| Flash point closed vessel °C. | | 144 |
| ASTM color | | 1 |
| Sulfur % by weight | | 2.05 |
| Nitrogen ppm | | 360 |
| Pour point °C. | | +21 |
| Cloud point °C. | | +21 |

TABLE 2

| CATALYSTS | A | B | C | D | E | F | G | H | I |
|---|---|---|---|---|---|---|---|---|---|
| T °C. | 420 | 405 | 395 | 390 | 395 | 395 | 395 | 420 | 400 |
| Yield 200+ % b.w. | | | | | | | | | |
| 10h | 90.8 | 78.7 | 78.7 | 77.7 | 78.1 | 79.1 | 78.8 | 91.1 | 79.3 |
| 50h | 90.1 | 79.5 | 77.3 | 77.9 | 78.3 | 79.5 | 79.1 | 90.0 | 80.1 |
| 100h | 91.3 | 78.9 | 78.4 | 78.0 | 79.1 | 77.9 | 79.0 | 89.2 | 79.1 |
| 200h | 91.1 | 79.1 | 78.8 | 77.8 | 78.3 | 78.5 | 78.7 | 90.5 | 79.5 |
| CP 200+ | | | | | | | | | |
| 10h | +15 | +6 | +3 | +3 | +3 | 0 | +3 | +15 | 0 |
| 50h | +12 | +3 | 0 | +3 | 0 | 0 | 0 | +18 | +3 |
| 100h | +15 | +3 | +3 | 0 | 0 | 0 | 0 | +15 | +3 |
| 200h | +15 | +6 | 0 | +3 | 0 | 0 | 0 | +15 | +3 |
| PP 200+ | | | | | | | | | |
| 10h | +12 | 0 | −6 | −9 | −6 | −6 | −6 | +12 | −6 |
| 50h | +9 | 0−6 | −6 | −6 | −6 | −3 | +12 | −3 | — |
| 100h | +12 | −3 | −6 | −3 | −6 | −6 | −6 | +12 | −3 |
| 200h | +12 | 0 | −3 | −6 | −6 | −6 | −6 | +12 | −3 |
| % HDS | | | | | | | | | |
| 10h | 98.1 | 98.2 | 98.7 | 97.8 | 97.7 | 97.1 | 96.8 | 71.5 | 98.9 |
| 50h | 98.0 | 98.4 | 97.8 | 96.8 | 97.1 | 96.8 | 96.9 | 69.3 | 98.9 |
| 100h | 97.4 | 97.8 | 97.1 | 97.9 | 96.9 | 96.7 | 95.9 | 57.5 | 98.4 |
| 200h | 97.6 | 97.2 | 96.7 | 95.8 | 97.2 | 96.3 | 95.1 | 61.6 | 98.1 |

What is claimed is:

1. A method for improving the low temperature properties and desulfurizing an oil cut having an initial boiling point of 180°–320° C. and a final boiling point of 320°–420° C., a sulfur content of 0.5–3.5% by weight and a pour point and cloud point higher than 0° C., said method comprising the step of contacting said cut with hydrogen, in the presence of a catalyst comprising:
(1) an acidic carrier comprising:
(a) at least 50% by weight, calculated as dry carrier, of highly dealuminated zeolitic mordenite having a molar $SiO_2/Al_2O_3$ ratio greater than or equal to 110 and a sodium content of not more than 0.5% by weight; and (b) an amorphous matrix; and (2) at least one Group VIII metal oxide, and at least one Group VI metal oxide;

at a pressure of 1.0–10.0 megapascals, a temperature of 300°–460° C., a space velocity of 0.2–3 VVH, and a volumic ratio $H_2$/oil of 200–1500; whereby the pour point and cloud point of the resultant oil are lowered by at least 10° C., and at least 90% desulfurization is achieved.

2. A method according to claim 1, wherein said oil is a middle gas-oil.

3. A method according to claim 1, wherein in said catalyst, the highly dealuminated mordenite has a molar ratio $SiO_2/Al_2O_3$ of from 110 to 2000.

4. A method according to claim 1, wherein in said catalyst, the dry zeolite content of the acid carrier, before deposition of the Group VI and VIII metal oxides, is from 55 to 90% by weight; the concentration, with respect to the catalyst, of said at least one Group VI metal oxide is from 6 to 35% by weight; and the concentration of said at least one Group VIII metal oxide is from 2 to 16% by weight.

5. A method according to claim 1, wherein in said catalyst, said Group VI metal oxide is molybdenum oxide and said Group VIII metal oxide is nickel oxide, the oxide contents being from 4 to 12% by weight of NiO and from 8 to 25% by weight of $MoO_3$, expressed with respect to the weight of total catalyst.

6. A method according to claim 1, wherein in said catalyst, said Group VI metal oxide is tungsten oxide and said Group VIII metal oxide is nickel oxide, the oxide contents being from 4 to 12% by weight of NiO and from 8 to 30% by weight of $WO_3$.

7. A method according to claim 1, wherein in said catalyst, said dealuminated mordenite contains up to 2% by weight of cations of at least one alkaline earth or lanthanide metal, said metal being beryllium, magnesium, lanthanum, cerium, neodymium or praseodymium.

* * * * *